United States Patent [19]

Gridnev

[11] Patent Number: 5,750,772
[45] Date of Patent: May 12, 1998

[54] DECOLORIZATION OF HYDROXY-CONTAINING METHACRYLATE HOMOPOLYMERS AND COPOLYMERS

[75] Inventor: Alexei Alexeyevich Gridnev, Greenville, Del.

[73] Assignee: E. I. du Pont de Nemours and Company, Wilmington, Del.

[21] Appl. No.: 791,373

[22] Filed: Jan. 30, 1997

[51] Int. Cl.⁶ .................................... C07C 67/48
[52] U.S. Cl. ........................................ 560/218
[58] Field of Search .............................. 560/218

[56] References Cited

U.S. PATENT DOCUMENTS

| | | | |
|---|---|---|---|
| 3,269,997 | 8/1966 | Lyons et al. | 260/94.9 |
| 3,440,235 | 4/1969 | Perreault | 260/92.1 |
| 3,709,928 | 1/1973 | Murayama et al. | |
| 4,298,580 | 11/1981 | Harper et al. | 423/40 |
| 4,298,759 | 11/1981 | Harper et al. | 562/485 |
| 4,379,940 | 4/1983 | Dickerson | 560/248 |
| 4,382,016 | 5/1983 | Rickelton et al. | 252/428 |
| 4,577,010 | 3/1986 | Bottazzini et al. | 528/487 |
| 4,668,818 | 5/1987 | Lipp et al. | |
| 4,699,999 | 10/1987 | El-Chahawi et al. | 562/450 |
| 4,870,156 | 9/1989 | Pino et al. | 528/487 |
| 4,956,154 | 9/1990 | Magdics et al. | 423/54 |
| 5,073,621 | 12/1991 | Tsiang | 528/483 |
| 5,130,107 | 7/1992 | De Munck et al. | 423/144 |
| 5,237,104 | 8/1993 | Summerlin | 568/451 |
| 5,468,899 | 11/1995 | Bauer et al. | |

FOREIGN PATENT DOCUMENTS

| | | |
|---|---|---|
| 56-6166148 | 12/1981 | Japan. |
| 2304051 | 12/1990 | Japan. |

OTHER PUBLICATIONS

A.A. Gridnev et al., *Introduction of Free Radicals Into The Macrocyclic Ring of Porphyrins During Polymerization of Vinylpyrrolidone*, Theor. And Exper. Chem. 25, p. 670, 1989.

*Primary Examiner*—Paul J. Killos

[57] ABSTRACT

This invention relates to a process whereby hydroxy-containing methacrylate homo- and copolymers are decolorized by the addition of a strong acid, and a chelating bidentate nitrogen ligand, with subsequent filtering through a polar adsorption medium.

15 Claims, No Drawings

DECOLORIZATION OF HYDROXY-CONTAINING METHACRYLATE HOMOPOLYMERS AND COPOLYMERS

FIELD OF THE INVENTION

This invention relates to a decolorization process for homopolymers and copolymers of hydroxy-containing methacrylates(e.g., 2-hydroxyethylmethacrylate (HEMA), hydroxypropylmethacrylate (HPMA), etc.), obtained by chain transfer catalysis with a substituted cobalt(III) boronfluoride compound used as the catalyst, by adding a bidentate nitrogen ligand and subsequently exposing the mixture to a polar absorbent medium.

TECHNICAL BACKGROUND

Chain transfer catalysis (CTC) has been shown to be a convenient method of preparing macromonomers by the free radical polymerization of methacrylates. However, all known CTC catalysts, including but not limited to COBF, TAPCo and CPCO, and their degradation products, including porphyrins (see generally A.A. Gridnev and E.M. Nechvolovdova, Theor. and Exper. Chem., 25 (1989), p. 670) are colored and, in order for these macromonomers to be used in their common end-uses such as clear coatings, the color must be removed.

Color removal from polymers is generally a poorly understood process, and specific methods are usually needed to decolorize a specific polymer system. General approaches have not been found to be possible, as modification to each particular system was required. An example of this may be found in U.S. Pat. No. 3,440,235, wherein only perfluorocarbon polymers can be decolorized by treating them with nitric acid. U.S. Pat. No. 4,379,940 outlines a process whereby colored agents are removed from liquid vinyl acetate monomer, but only after several steps including anion exchange resin and activated carbon beds. An approach which describes in sufficient detail a method applicable to a variety of products, as well as a method by which the specific details of the method could be chosen, would be a considerable improvement over the current state of the art.

HEMA homo- and copolymers can also be decolorized by choosing a Co catalyst of an appropriate polarity and subsequent treatment with an adsorbent medium. In general, the method consists of dilution of the reaction mixture, comprised of the selected Co chain transfer catalyst, initiator and macromonomers (e.g., methacrylates), with relatively poor solvents, followed by treatment with a sorbent or other solvent which will form a separate phase from the initial phase. This necessitates determining the relative polarity of the macromonomers and the subsequent choice of the appropriate Co catalyst, as well as distillation or extraction of the desired macromonomers. However, purification of HEMA by extraction has been unsuccessful. Additionally, the instant invention described below is less costly and simpler to do and thus can represent a significant cost savings for HEMA decolorization.

SUMMARY OF THE INVENTION

This invention relates to a process for the decolorization of hydroxy-containing methacrylate homo- and co-polymers of the formula

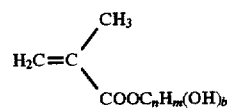

wherein n>2, m>4 and b >1;
comprising the steps of exposing the polymers to:
an acid having a pKa less than about 2;
a chelating bidentate nitrogen ligand containing a fragment of the formula alkylidene($NR_2$)$_x$(imidazolyl)$_y$, wherein y>1 and (y+x)>2, wherein the alkylidene is $C_2$ to $C_{10}$, preferably $C_2$ to $C_4$, and each R is independently H or $C_1$ to $C_{10}$ alkyl; and
a polar absorbent medium.

DETAILS OF THE INVENTION

The instant invention relates to a process for the decolorization of hydroxy-containing methacrylate homopolymers and copolymers. HEMA, as an example, is a monomer commonly used in systems designed for use as coatings, especially clear coats for automotive end-uses as well as for water-soluble polymers, dispersants and adhesives.

General Polymerization Procedure

The chain transfer catalyst used herein is designated COBF, which represents the family of chemicals defined by Bis-[(1,2-diR*-ethanedioximato)(2-)O:O'-tetrafluorodiborato(2-)-N'N''N'''N'''](A)(B) cobalt(III), where R* is alkyl, aryl or substituted aryl, A is an alkyl or substituted alkyl ligand or an acido ligand (e.g., cloro, bromo), and B is a Lewis base (e.g., water, pyridine, imidazole, phosphine, as well as their derivatives). It is preferred that R* is methyl, A is isopropyl and B is water. The COBF used in the examples below was of this preferred composition. In addition to the cobalt(III) compounds described above, corresponding cobalt(III) compounds can also be used as catalysts for the invention described herein.

In a method known to those skilled in the art (see generally Janowicz, U.S. Pat. No. 4,680,352, which is incorporated herein by reference), a 30 mg quantity of the chain transfer catalyst, COBF, was dissolved in 50 ml of a mixture of ethyl acetate and alcohol (designated as "co-solvent" in Table 1 below), followed by the addition of 500 mg VAZO®-52 (2,2'-azobis(2,4-dimethylvaleronitrile), DuPont Co., Wilmington, Del.) and 50 ml HEMA. The resulting mixture was deoxygenated and then heated in a stepwise manner. The temperature sequence was 3 hr at 60° C., 2 hr at 65° C., 1 hr at 70° C., and 1 hr at 75° C. Although the examples below were done in a "batch" mode, continuous mode (CSTR) could also be used for the polymerization step.

The color of the resulting product was measured using a UV spectrometer (Spectrometer 330, Perkin-Elmer Corp., Norwalk, Conn.) at 450 nm in a 1 cm cuvette. The value is reported as the "optical density" (OD), which is empirically obtained by the following equation:

$$OD = 1000 \frac{\text{(optical density of product)}}{\text{(\% of solids + monomer)}}$$

The higher the OD, the deeper the macromonomer color. The optical density (OD) of the samples prepared by this procedure are listed in the column designated "OD before" column of Table 1.

The ethyl acetate can be replaced with chloroform, dichloroethane or other inert organic solvent to solubilize the catalyst, as is known to those skilled in the art. Additives of water or alcohol to the solvent were found to be important to prevent phase separation during the polymerization for products having an average degree of polymerization (DP) greater than about 2.5. Such phase separation often resulted in a reduction of the effective catalyst concentration in the hydroxy-containing methacrylate layer, resulting in an uncontrolled rise in MW of the polymer product.

General Decolorization Procedure

The reaction mixture obtained by the above process, and listed as Examples 1–7 in Table 1 below, was acidified with approximately 0.1% HCl. After 30 min. 0.3% by weight 1-(3-aminopropyl)imidazole was added and the solution was passed through a short column of silica gel. The color of the resulting product is listed in Table 1 as "OD after". The measurements were made at 450 nm as this is the region where the highest absorption of visible light occurs. Generally, the higher the OD, the deeper the macromonomer color.

Although HCl was used in the examples below, any strong acid (i.e., one that has a pKa less than about 2) can be used.

The chelating bidentate nitrogen ligands which are applicable in this invention include those containing a fragment of the general formula alkylidene(NR$_2$)$_x$(imidazolyl)$_y$, wherein y>1 and (y+x)>2; wherein the alkylidene is C$_2$ to C$_{10}$, preferably C$_2$ to C$_4$, and R is independently H or C$_1$ to C$_{10}$ alkyl. Examples of these ligands include histamine, vinyl acetate/vinylimidazole low MW copolymer, 4-methyl imidazole, nicotinamide, and 1-(3-aminopropyl)imidazole. Polar absorbent media that may be used include silica and alumina, which are relatively inexpensive. Other media such as molecular sieves or zeolites could be used but might be cost-prohibitive.

Unless otherwise specified, all chemicals and reagents were used as received from Aldrich Chemical Co., Milwaukee, Wisc. The following definitions are used herein.
HEMA=2-hydroxyethyl methacrylate
VAZO®-52=2,2'-azobis(2,4-dimethylvaleronitrile) (DuPont Co., Wilmington, Del.)
EA=ethyl acetate
DCE=1,2-dichloroethane
MEK=methylethylketone
MMA=methylmethacrylate
BMA=butylmethacrylate
BA=butyl acetate
HMPA=mixture of 3- and 2-hydroxypropyl methacrylate

EXAMPLES

Table 1 represents the data obtained for Examples 1–7, which followed the procedure described in the previous section.

TABLE 1

Composition and Properties of Hydroxy-containing methacrylate homo- and co-polymers before and after chemical decolorization

| Ex. No. | Solvent (%) | Co-Solvent (%) | Monomer (%) | OD before | OD after | DP |
|---|---|---|---|---|---|---|
| 1 | BA (30) | methanol (15) | HEMA/BMA = 6:1 (55) | 11 | 3.1 | 6 |
| 2 | MEK (30) | none | HEMA/MMA = 7:3 (70) | 48 | 3.7 | 4 |
| 3 | EA (50) | none | HEMA (50) | 58 | 4 | 2.5 |
| 4 | EA (40) | water (10) | HEMA (50) | 49 | 3.5 | 2.9 |
| 5 | EA (40) | ethanol (10) | HEMA (50) | 54 | 1.7 | 2.2 |
| 6 | EA (40) | 2-propanol (10) | HEMA (50) | 60 | 3.2 | 2.4 |
| 7 | DCE (40) | methanol (10) | HEMA (50) | 51 | 2.5 | 2.5 |
| 8 | EA (30) | methanol (20) | HPMA (50) | 37 | 1.8 | 5.3 |

Table II shows a comparison of the results obtained by the use of different nitrogen-containing reagents as decolorization agents. The reagent listed in column 1 was added to the reaction mixture obtained from a HEMA polymerization (HEMA:EA:Ethanol::5:3:2 by volumne) using COBF as the catalyst, according to the procedure found above.

TABLE II

| Reagent | OD Before Decolorization | OD After Decolorization |
|---|---|---|
| 3-aminopropylimidazole | 27 | 2.3 |
| Histamine (4-(2-aminoethyl)imidazole) | 27 | 1.7 |
| 4-methylimidazole | 27 | 5.2 |
| Nicotinamide | 27 | 7.8 |
| Copolymer of vinylacetate and 1-vinylimidazole | 27 | 2.1 |

What is claimed is:

1. A process for decolorizing homo- and co-polymers of hydroxy-containing methacrylates of the formula

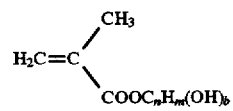

wherein n>2, m>4 and b>1;
wherein said homo- and co-polymers are prepared in the presence of a chain transfer catalyst;
comprising the steps of exposing the polymers to:
(a) an acid having a pKa less than about 2;
(b) a chelating bidentate nitrogen ligand containing a fragment of the formula alkylidene(NR$_2$)$_x$ (imidazolyl)$_y$
wherein y>1 and (y+x)>2;
said alkylidene is C$_2$ to C$_{10}$;
each R is independently H or C$_1$ to C$_{10}$ alkyl; and
(c) a polar absorbent medium.

2. The process as recited in claim 1, wherein said acid is a strong mineral acid.

3. The process of claim 2 wherein said acid is selected from the group consisting of hydrochloric acid, hydrobromic acid, hydroiodic acid, nitric acid, sulfuric acid and perchloric acid.

4. The process as recited in claim 1, wherein said ligand is 1-(3-aminopropyl)-imidazole.

5. The process as recited in claim 1, wherein said absorbent medium is silica gel.

6. The process as recited in claim 2, wherein said catalyst is Bis-[(1,2-diR*-ethanedioximato)(2-)O:O'-tetrafluorodiborato(2-)-N'N"N'"N""](A)(B) cobalt(III), where R* is alkyl, aryl or substituted aryl, A is an acido ligand, and B is a Lewis base.

7. The process as recited in claim 4, wherein said catalyst is Bis-[(1,2-diR*-ethanedioximato)(2-)O:O'-tetrafluorodiborato(2-)-N'N"N'"N""](A)(B) cobalt(III), where R* is alky, aryl or substituted aryl, A is an acido ligand, and B is a Lewis base.

8. The process as recited in claim 5, wherein said catalyst is Bis-[(1,2-diR*-ethanedioximato)(2-)O:O'-tetrafluorodibrato(2-)-N'N"N'"N""](A)(B) cobalt(III), where R* is alkyl, aryl or substituted aryl, A is an acido ligand, and B is a Lewis base.

9. The process as recited in claim 6, 7, or 8, wherein R* is methyl, A is isopropyl and B is water.

10. The process as recited in claim 2, wherein said acid is added first to the reaction mixture followed by the addition of 1-(3-aminopropyl)-imidazole and then the mixture is filtered through a bed of silica gel.

11. The process as recited in claim 1, wherein said alkylidene is $C_2$ to $C_4$.

12. The process as recited in claim 2, wherein said catalyst is described as indicated Bis-[(1,2-diR*-ethanedioximato)(2-)O:O'-tetrafluorodiborato(2-)-N'N"N'"N""]cobalt(II), where R* is alkyl, aryl or substituted aryl.

13. The process as recited in claim 4, wherein said catalyst is Bis-[(1,2-diR*-ethanedioximato)(2-)O:O'-tetrafluorodiborato(2-)-N'N"N'"N""]cobalt(II), where R* is alkyl, aryl or substituted aryl.

14. The process as recited in claim 5, wherein said catalyst is Bis-[(1,2-diR*-ethanedioximato)(2-)O:O'-tetrafluorodiborato(2-)-N'N"N'"N""](A)(B) cobalt(III), where R* is alkyl, aryl or substituted aryl, A is an acido ligand, and B is a Lewis base.

15. The process as recited in claim 12, 13, or 14 wherein R* is phenyl.

* * * * *